US006976007B1

(12) United States Patent
Boucher et al.

(10) Patent No.: US 6,976,007 B1
(45) Date of Patent: Dec. 13, 2005

(54) METHOD AND SYSTEM FOR MULTI-CARRIER PACKAGE TRACKING

(75) Inventors: Glen A. Boucher, Ansonia, CT (US); Terri A. Carroll, Milford, CT (US); Kenneth Karbowski, Farmington, CT (US); Angela Njo, Shelton, CT (US); Richard J. Krouch, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/411,524

(22) Filed: Oct. 4, 1999

(51) Int. Cl.[7] ............................................... G06F 17/60
(52) U.S. Cl. ............................... 705/28; 705/27; 705/26
(58) Field of Search ............................... 705/26, 27, 28

(56) References Cited

U.S. PATENT DOCUMENTS

| | | | |
|---|---|---|---|
| 4,832,204 A | 5/1989 | Handy et al. ................. | 209/3.3 |
| 5,038,283 A | 8/1991 | Caveney ...................... | 364/403 |
| 5,117,096 A | 5/1992 | Bauer et al. ................. | 235/375 |
| 5,262,939 A | 11/1993 | Vanpoucke .................. | 364/401 |
| 5,313,052 A | 5/1994 | Watanabe et al. ........... | 235/375 |
| 5,635,694 A | 6/1997 | Tuhro ......................... | 235/375 |
| 5,712,789 A | 1/1998 | Radican .................. | 364/478.14 |
| 5,787,400 A | 7/1998 | Weber .......................... | 705/1 |
| 5,852,809 A | 12/1998 | Abel et al. .................. | 705/26 |
| 5,869,819 A | 2/1999 | Knowles et al. ............. | 235/375 |
| 5,910,896 A | 6/1999 | Hahn-Carlson ........ | 364/479.01 |
| 5,940,399 A | * 8/1999 | Weizman ..................... | 370/455 |

FOREIGN PATENT DOCUMENTS

| | | | | |
|---|---|---|---|---|
| WO | WO 99/22339 | * 5/1999 | ........... | G06F/17/60 |
| WO | WO 00/46726 | * 8/2000 | ........... | G06F/17/60 |

OTHER PUBLICATIONS

Karpinski, Richard, Mail room mainstay tracks packs, Oct. 20, 1997 Internet Week p.1.*
Frook, John Evan, APIs could open up shipping options for web store fronts, Feb. 9, 1998, Internet week, p9.*
Pitney Bowes, Pitney Bowes Introduces New Star ™ Carrier management system. Oct. 10, 1992, News Release, p1.*
Karpinski, Richard, Mail Room Mainstay Tracks packs, Phillips Business information's Internet week; Oct. 20, 1997.*
Webmethods, http://web.archive.org/web/19980117223721/webmethods.com/home.html, dated Jan. 17, 1998, pp. 3–4.*
Webmethods, http://web.archive.org/web/19980117225523/webmethods.com/products/toolkit/userguide/abc . . . , dated Nov. 17, 1998., pp. 5–7.*

(Continued)

*Primary Examiner*—Jeffrey A. Smith
*Assistant Examiner*—Mark Fadok
(74) *Attorney, Agent, or Firm*—Brian A. Lemm; Angelo N. Chaclas

(57) ABSTRACT

A tracking system and method uses a multi-threaded controller to automatically and periodically generate tracking objects that are presented to carrier tracking websites. The tracking objects are retrieved from input queues that receive tracking requests from a scheduler. The carrier tracking website updates the status of package delivery which in turn updates the data in the shipping system server with respect to tracking information. This updated information can be used to automatically generate E-mail notification of package delivery as well as for updated purposes. An instant track component allows a user to obtain prioritized tracking information from the associated carrier tracking website.

15 Claims, 7 Drawing Sheets

OTHER PUBLICATIONS

Webmethods, http://web.archive.org/web/19980117225604/webmethods.com/technology/automating.html, dated Nov. 17, 1998, pp. 8–24.*

Webmethods, http://web.archive.org/web/19980117224100/webmethods.com/news/anaysts/ncfocus.html, dated Jan. 17, 1998, pp. 25–31.*

Webmethods, http://web.archive.org/web/19980117225523/webmethods.com/products/toolkit/userguide/toc . . . , dated Jan. 18, 1998 pp. 32–37.*

Webmethods, http://web.archive.org/web/19980118000757/webmethods.com/products/toolkit/userguide/toc . . . , dated Jan. 18, 1998, pp. 38–41.*

Webmethods, http://web.archive.org/web/19980118005124/webmethods.com/products/toolkit/userguide/abc, dated Jan. 18, 1998, pp. 42–43.*

Webmethods, http://web.archive.org/web/19980118000834/webmethods.com/products/toolkit/userguide/toc . . . , dated Jan. 18, 1998, pp. 44–45.*

* cited by examiner

METHOD AND SYSTEM FOR MULTI-CARRIER PACKAGE TRACKING

CROSS REFERENCE TO RELATED APPLICATION(S)

Reference is made to U.S. application Ser. No. 09/411,092, filed on even date herewith, entitled, A METHOD AND SYSTEM FOR ESTABLISHING PARCEL SHIPPING VIA THE INTERNET; assigned to the assignee of this application, Reference is made to U.S. application Ser. No. 09/411,125, filed on even date herewith, entitled, A METHOD AND SYSTEM FOR RESOLUTION OF CARRIER SPECIFIC DATA UTILIZING A GENERIC DATA MODEL, assigned to the assignee of this application. The subject matter of each of these applications is hereby incorporated by reference.

TECHNICAL FIELD

The present invention relates to package tracking, particularly to the tracking of a package enroute from the sender to the recipient, wherein the package may be delivered by one or a plurality of package carriers.

BACKGROUND OF THE INVENTION

In a shipping system such as set forth in co-pending application, U.S. Ser. No. 09/411,092 filed Oct. 4, 1999 entitled, A Method and System for Establishing Parcel Shipping Via The Internet one of the components thereof is the ability to be able to track the location of a package while it is transit from the sender (user of the shipping system) to the recipient. It is desirable to be able to do this tracking regardless of the particular carrier which is actually delivering the package, as well as to be able to provide additional services and features concerning package location and delivery.

SUMMARY OF THE INVENTION

In the package tracking system and method according to the present invention, the user (sender) of a package is able to determine the package's location while enroute to the recipient. In order to achieve this result, the present invention uses network based services and in particular, the Internet to provide the means for transferring tracking information from the carrier responsible for delivery of the package to the party requesting information, typically the sender. In particular, the architecture of the present invention comprises tracking objects which are transferred to the carrier's tracking website in a manner so as to properly request information with regard to an identified package. The shipping system server is responsible for creating the tracking objects, as well as for accessing the selected carrier's tracking website. In particular, the tracking objects are created and their creation and transfer controlled by a tracking coordinator forming part of the shipping system's server. The tracking coordinator performs these tasks through use of registry settings associated with the operating system under which the shipping system server is operating.

The tracking coordinator of the shipping system's server controls these objects by timing the initiation of delivery of the objects to the carrier, as well as the frequency of these deliveries so as to comply with carrier requirements concerning requests for tracking information. The overall result is that tracking of a package is obtainable in a straightforward fashion and in a manner which does not overload the carrier tracking website.

BRIEF DESCRIPTION OF THE DRAWINGS

For a fuller understanding of the nature and objects of the present invention, reference is made to the following detailed description taken in conjunction with the following drawings in which.

DETAILED DESCRIPTION

Figure 1:
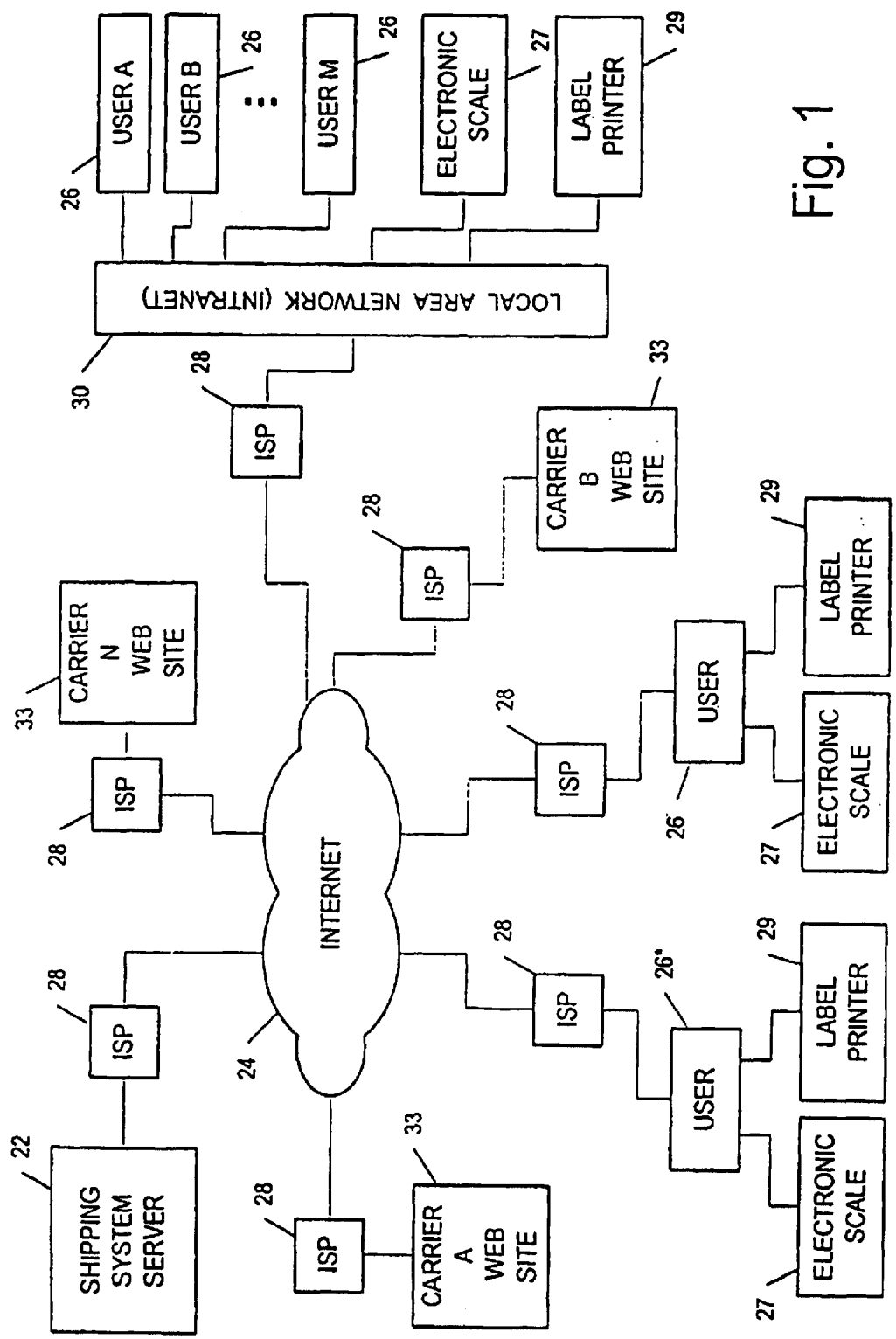
FIG. 1 is a diagrammatic representation of the shipping system and method which may use the tracking system and method of the present invention.

The tracking system and method of the present invention forms part of an overall shipping system and method as described in copending, U.S. application, Ser. No. 09/411,092 filed Oct. 4, 1999 entitled, A Method and System for Establishing Parcel Shipping Via the Internet (E-907); and U.S. application, Ser. No. 09/411,125 filed Oct. 4, 1999 entitled, A Method and system for Resolution of Carrier Specific Data Utilizing a Generic Data Model (E-909). As best seen in FIG. 1, this overall shipping system 20 comprises a shipping system server 22 and one or more users (senders) 26 which interact with the server by means of the Internet 24, typically through connection through an Internet service provider 28. Although a plurality of users at a single location are shown which are interconnected by a local area network 30, the system also allows other users (e.g. users 26 and 26') to access the shipping system via the Internet.

Figure 2:
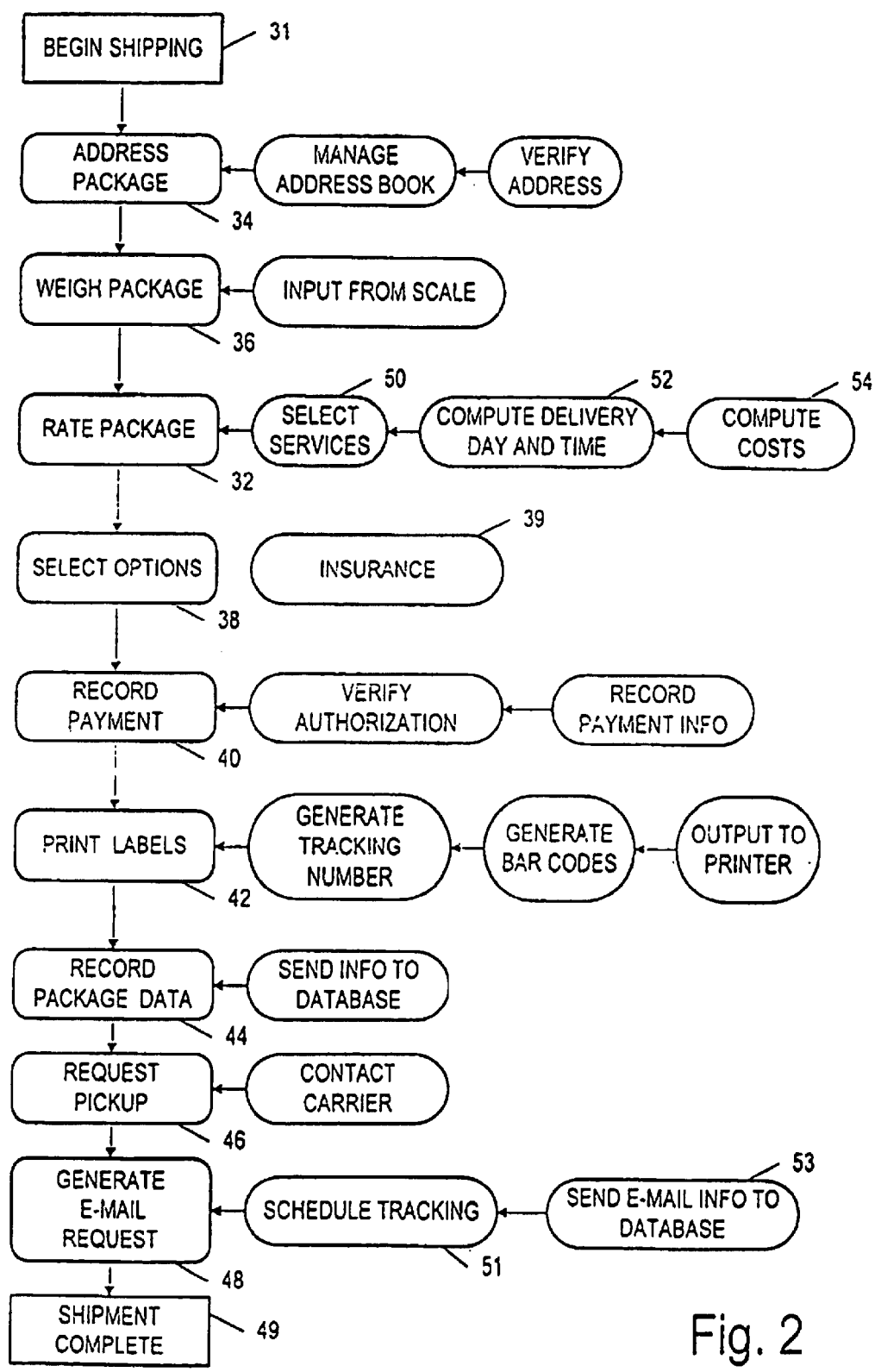
FIG. 2 is a flow chart of a typical sequence of shipping steps associated with a shipping system and method in which the tracking system of the present invention forms a part thereof.

FIG. 2 illustrates the sequence of steps and sub-steps executed in order for a package to be shipped using the shipping system and method. Thus between the begin shipping step 31 and the shipping complete determination step 49, there can be a number of steps including the determination of the rate associated with sending the package, step 32, the determination of the address of the recipient, step 34; the determination of the weight of the package, step 36; options associated with the package, step 38, such as a possible insurance sub-step 39, the recording of payment sequence step 40; the printing of labels for the package, step 42; the recording of data associated with the package, record package data sequence step 44; whether a request for pick-up is made, request pick-up step 46; and the generation of E-mail requests including requests regarding the scheduling of tracking and the like, step 48 and sub-steps 51 for schedule tracking and the sending of e-mail information to the system service database, sub-step 53.

Figure 3:
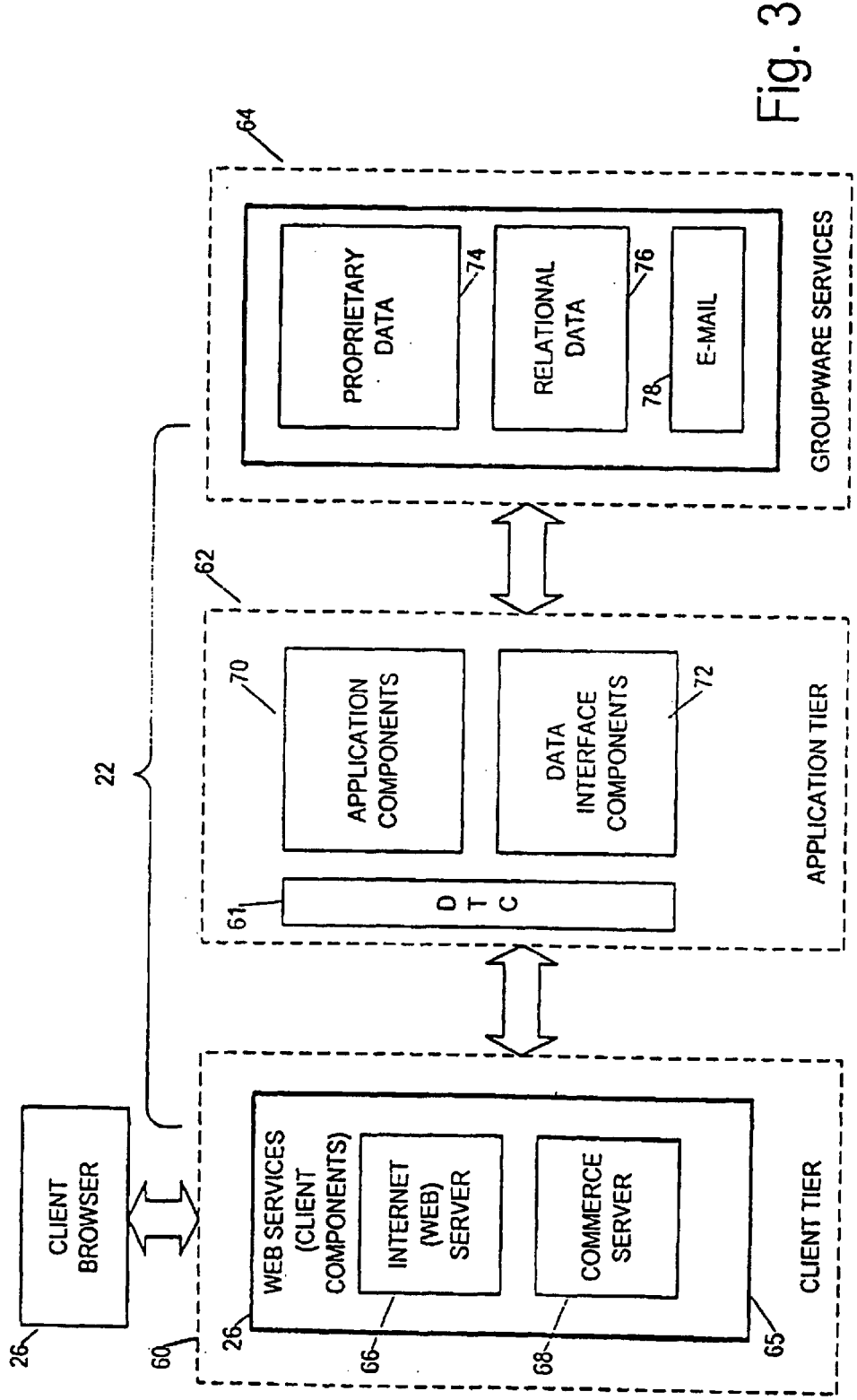
FIG. 3 is an overall block diagram showing the typical architectural implementation of the shipping system and method of which the tracking system forms a part thereof.
Figure 4:
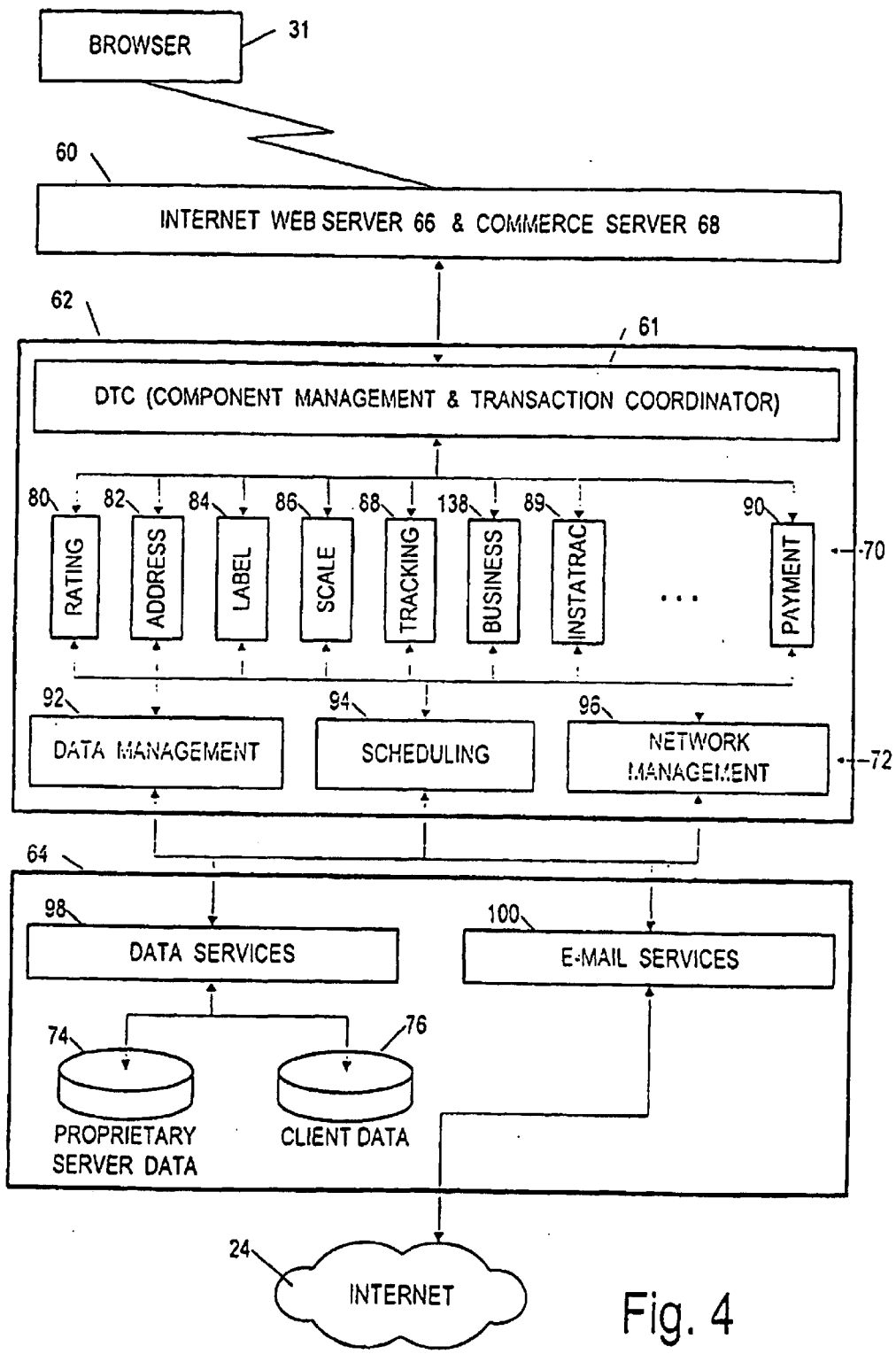
FIG. 4 is a more detailed block diagram of the architecture for the shipping system of which the tracking system of the present invention forms a part thereof.
Figure 5:
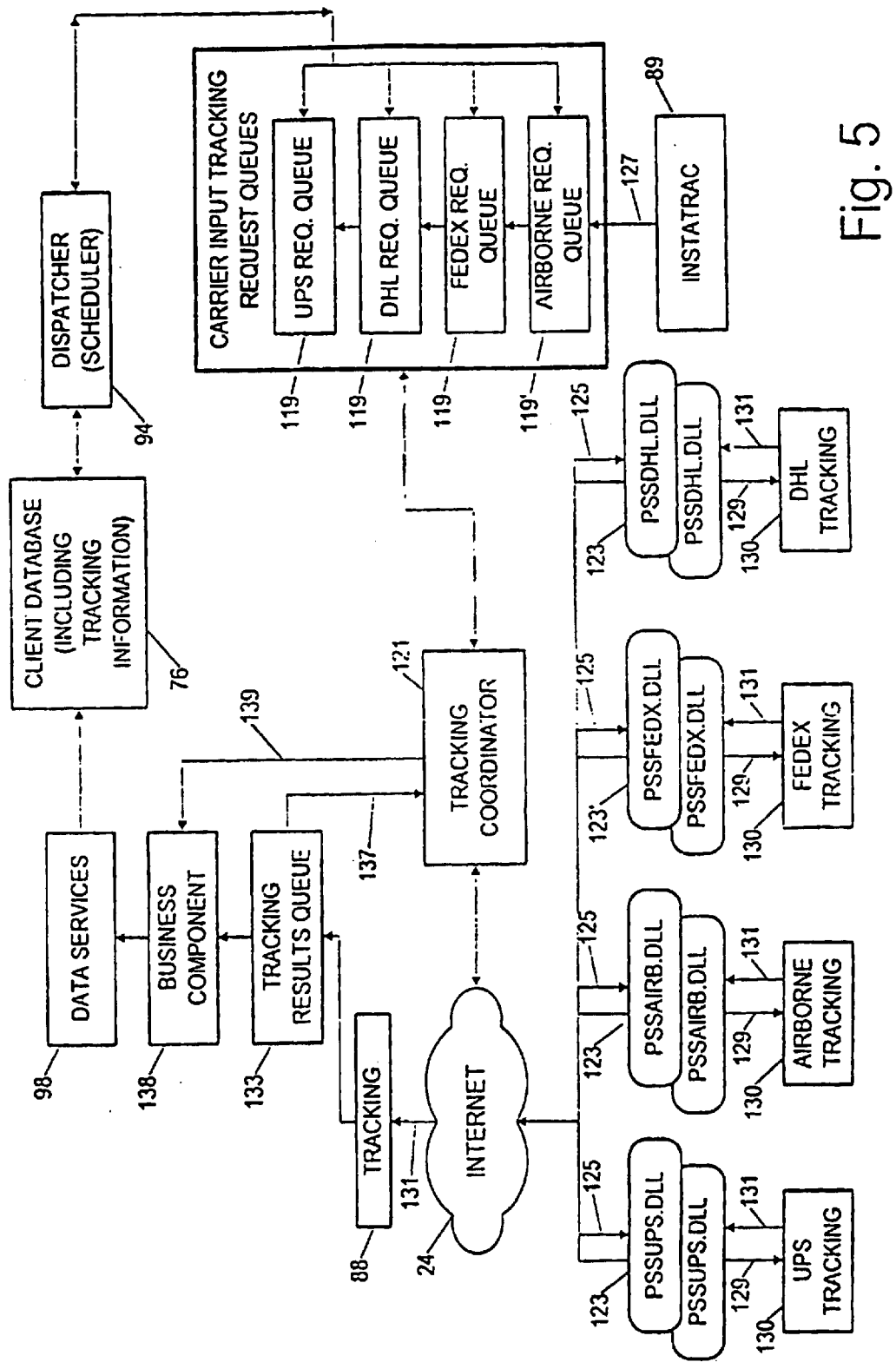
FIG. 5 is a diagrammatic representation of the tracking system and method, illustrating the multi-threaded implementation of the program execution.

In order to implement these sequence of steps, the shipping system and method uses a multi-tier architecture such as shown in FIGS. 3 and 4. The tracking component 88 and InstaTrac component 89 are best illustrated in FIG. 5 with respect to their operations. FIG. 5 is a diagrammatic representation of the tracking system (comprising components 88, 89, 98 and 138). In operation, a user 26 desiring tracking information makes such a request over the Internet to the shipping system server 22 (FIG. 1). This shipping server operates so as to generate a tracking object which is a component object model (COM) created by the InstaTrac component 89. The task of this tracking object is to initiate an Internet request to the selected carrier's tracking website 130, where each carrier has its own tracking component associated with its web based services. The shipping system server tracking component 88 controls sending tracking object the designated carrier tracking website. In order to do this, the tracking number created at the time that the package was shipped (see FIG. 2 for sub-step 41) is used to identify the package to the corresponding carrier tracking website 130. The creation of these tracking objects must be paced since various carriers restrict the number of tracking objects that can be sent to the carrier tracking website. For example, a particular carrier tracking website may restrict the number of requests from a particular Internet Protocol (IP) address to one request every ten seconds. Thus, if the carrier sees tracking objects more frequently than one every ten seconds, it may interpret the tracking objects as an attack on the tracking website, resulting in lockout of the IP address.

In addition, other carriers may permit only a fixed number of tracking objects within a specified period of time, without regard to the frequency of such requests. It is thus the obligation of the shipping server tracking coordinator 121 to ensure that tracking objects are controlled with respect to the frequency of their generation in view of the requirements of each of the carrier tracking websites. As seen in FIG. 5, this is accomplished by the tracking coordinator 121. The tracking coordinator generates tracking objects 123 for delivery over the Internet 24 to the associated carrier tracking website 130. As seen in FIG. 5, tracking objects are designated by the tracking coordinator 121 for each carrier in which tracking information is desired. The tracking coordinator obtains information for these tracking objects from corresponding carrier input tracking request queue 119. For each tracking object within a tracking request queue, the tracking coordinator obtains that request through an associated programming thread since the tracking coordinator operates in a multi-threaded manner.

Depending upon the pacing constraints set by the carrier, multiple threads for generating multiple tracking objects are generated. Thus for instance as shown in FIG. 5 for tracking objects to be sent to the Airborne tracking website 130, multiple Airborne tracking objects 123' can be generated. In this example, Airborne may have a constraint that no more than five tracking objects can be generated within a predetermined length of time and these tracking objects all would be then generated (assuming that at least that number of tracking requests are in the Airborne tracking request queue 119') by the tracking coordinator on individual software threads 125. Similarly, the tracking coordinator generates tracking objects via individual threads for each of the carriers supported by the shipping system server, which in the example shown in FIG. 5 comprises four carriers; namely, Airborne, UPS, FedEx and DHL.

As also seen in FIG. 5, a user of the shipping system can request an instant track regarding a package for which the tracking number is known by the user. This is shown by InstaTrac component 89 which is executed by the shipping server (see FIG. 1) and which is conveyed to the appropriate carrier input tracking request queue 119 as shown by line 127. Such a tracking request from a user will generally take priority over other tracking requests that are periodically received from the tracking component 88 and which are generated in an automatic fashion by the shipping server so as to maintain tracking information for all of the packages handled by the shipping server. This prioritization is accomplished by placing the InstaTrac request at the top of the associated queue 119.

The tracking objects as discussed above are conveyed to the corresponding carrier tracking website 130 via the Internet 24 as shown by arrows 129. The carrier tracking website 130 then processes each tracking request from the tracking object and generates a tracking response which is conveyed as an HTML page 131. The HTML page contains the tracking status and is transferred via the Internet 24 to the tracking component 88. The tracking component then parses the HTML and extracts the tracking request results. The results are then sent to the tracking results queue 133. The tracking coordinator via path 137 senses if tracking results data is in the tracking result queue. If data is sensed, the tracking coordinator via path 139 causes the business component 138 to receive the data from the tracking results queue. This component is used to update the data services module 98 in the groupware services tier 64 (see FIG. 4) so as to convey the updated tracking information to the proprietary database 74. Tracking coordinator 121 controls the business component 138 via control line 139.

Thus an important aspect of the tracking coordinator is its multi-threaded executable architecture which allows for simultaneous generation of tracking objects for various carriers, all within the pacing constraints associated with the individual carriers. Thus the tracking coordinator operates as a multi-threaded service. It accepts commands from the scheduling component 94 which is used to initiate the autonomous or automatic generation of tracking requests for maintaining updated tracking information concerning outstanding packages.

Details of the Tracking Coordinator:

The tracking coordinator 121 gathers its inputs from the carrier input tracking request queues 119. Each carrier is seen to have a corresponding queue. The names of each input queue is stored in the operating system Registry, along with other carrier information. For each carrier found within the Registry a thread 127 is generated. This thread monitors the corresponding carrier input queue for incoming messages.

The tracking request messages stored in the input queues 119 are deposited by the scheduling module 94 (see FIG. 4) or by the InstaTrac module 89.

The InstaTrac module creates a tracking request from an ASP request and then to the associated carrier input queue 119 as shown by arrow 127. Such an InstaTrac tracking request contains a record set and the tracking coordinator extracts the tracking request from the queue as soon as it is placed there, thereby prioritizing the InstaTrac tracking request. The tracking coordinator then extracts the record set to from the tracking request and invokes an outgoing tracking object thread 125 that activates the corresponding carrier's tracking component at the carrier's tracking website 130. The tracking coordinator sends several parameters to the carrier's tracking component, one of which is the record set that contains information pertinent to the particular tracking request, regardless of the origin of the tracking request.

The record set in general may contain one or more records. If the record set contains a single record, the tracking coordinator invokes a single tracking object and provides the record set as a parameter of that object. This mode of operation is called the "same mode". If however the tracking request contains a record set with many records, referred to a "mixed mode", the tracking coordinator separates the record set and dispenses the individual records as individual tracking objects. The individual tracking objects are then distributed in a timely manner in order to meet the specified pacing requirements of the associated carrier.

The tracking coordinator only creates tracking object threads if it is allowed to place another tracking object within a specified time period. This time frame information which is keyed to the individual carrier is again stored in the operating system Registry. Thus for instance, if the carrier's tracking website only allows for a particular IP address to send two requests in a one minute time interval, this information is stored in the Registry. Then when the tracking coordinator generates tracking objects, it obeys this constraint by invoking threads only within that time constraint. In this manner, the carrier's tracking website does not deny access by these tracking objects since they are generated at a pace which is within the constraint set by that carrier.

As also seen in FIG. 5, the tracking coordinator via control line 139 launches the business component software module. This component, as explained earlier, invokes the data services module 98 which is responsible for updating the tracking information stored within the client (user) database 76.

Since the tracking coordinator operates as a Microsoft Windows NT service, it is started from a service control program. The service's icon within the control panel is an SCP that can manipulate the states of a service.

Once the service installs into the Registry (HKEY_LOCAL_MACHINE\YSTEM|CurrentControlSet\Services) it is manipulated via a SCP. Preferably this service has its startup mode set to automatic. This allow the tracking coordinator to start upon system startup, thus providing continuous service. Table 1 provides the commands for Registry installation and removal of the service.

TABLE 1

| tracking coordinator - install | Installs the service into the Registry. |
| tracking coordinator - remove | Removes the service from the Registry. |

This service supports the Start, Stop, Pause and Continue commands.

Start

Begins the carrier threads.

Stop stops all carrier threads and waits for any tracking component threads to exit before stopping the service. This command may take up to 30 seconds to complete if there are several tracking component threads still running.

Pause

This command suspends all carrier threads currently running.

Continue

This command resumes any carrier threads that may have been suspended due to a Pause command.

System Requirements

The tracking coordinator needs to access the carrier input queues 119. These queues are made available on the same domain. Further, in order to access any of the queues their names are made available through the Registry.

Compiler & Linker Requirements

This component is created with Visual Studio C++6.0.

In order to debug this component it is sometimes necessary to not run it as a service. The command of tracking coordinator—debug can be used to run the tracking coordinator from a Command Prompt window. In this mode the component runs without any interaction from the SCM.

Error Logging

All error and informational messages are written to the NT system application event log.

Registration Details

The following registry entries must be provided. Failure to furnish any one of the key or string values results in the service not being able to start. The failure is logged to the Systems Event View, Application Log.

[HKEY_LOCAL_MACHINE\SOFTWARE\PitneyBowes\PSS]
"MSMQServer"="Glenserver\\"
"ResultsQ"="trackingresultsq"

Each carrier that is monitored must have the following entry with the corresponding string values.

[HKEY_LOCAL_MACHINE\SOFTWARE\PitneyBowes\PSS\Carriers]
[HKEY_LOCAL_MACHINE\SOFTWARE\PitneyBowes\PSS\Carriers\49]
"Trac_URL"="208.243.33. 1 79/tracktest/default.asp"
"RequestQ"="upsrequestq"
"ObjectsPerTimeFrame"="2"
"RecordsSetMode"="Same"
"RecsPerRecSet"="50"
"Symbol"="UPS"
"TimeFrameUnits"="min"
"Token"="49"

Registry String Value Definitions

Registry string values as set forth in Table 2.

TABLE 2

MSMQServer: This is the name of the server where the tracking queues exist.
ResultsQ: Name of the queue that a tracking component dumps its results.
Trac_URL: The URL that the tracking component hits.
RequestQ: Name of the carrier input queue 119 that the tracking coordinator extracts requests.
ObjectsPerTimeFrame: This is the number of tracking components that the tracking coordinator allows per time frame (i.e. minutes or hour).
RecordSetMode: Each message that is placed on a carrier queue contains a record set. A record set may contain one or many records. If the value of this string value is "Same", the record set contains only one record. If the value is "Mix", the record set can contain many records.
RecsPerRecSet: Maximum number of records a message's record set can contain.
Symbol: The carrier's symbol. This symbol is used to form the tracking component's OLEProgID (i.e. PSSUPS.ParseUPS).
TimeFrameUnits: The time frame that a specified number of Tracking Components can be invoked (i.e. minutes or hour).
Token: The carrier's token.

Figure 7:
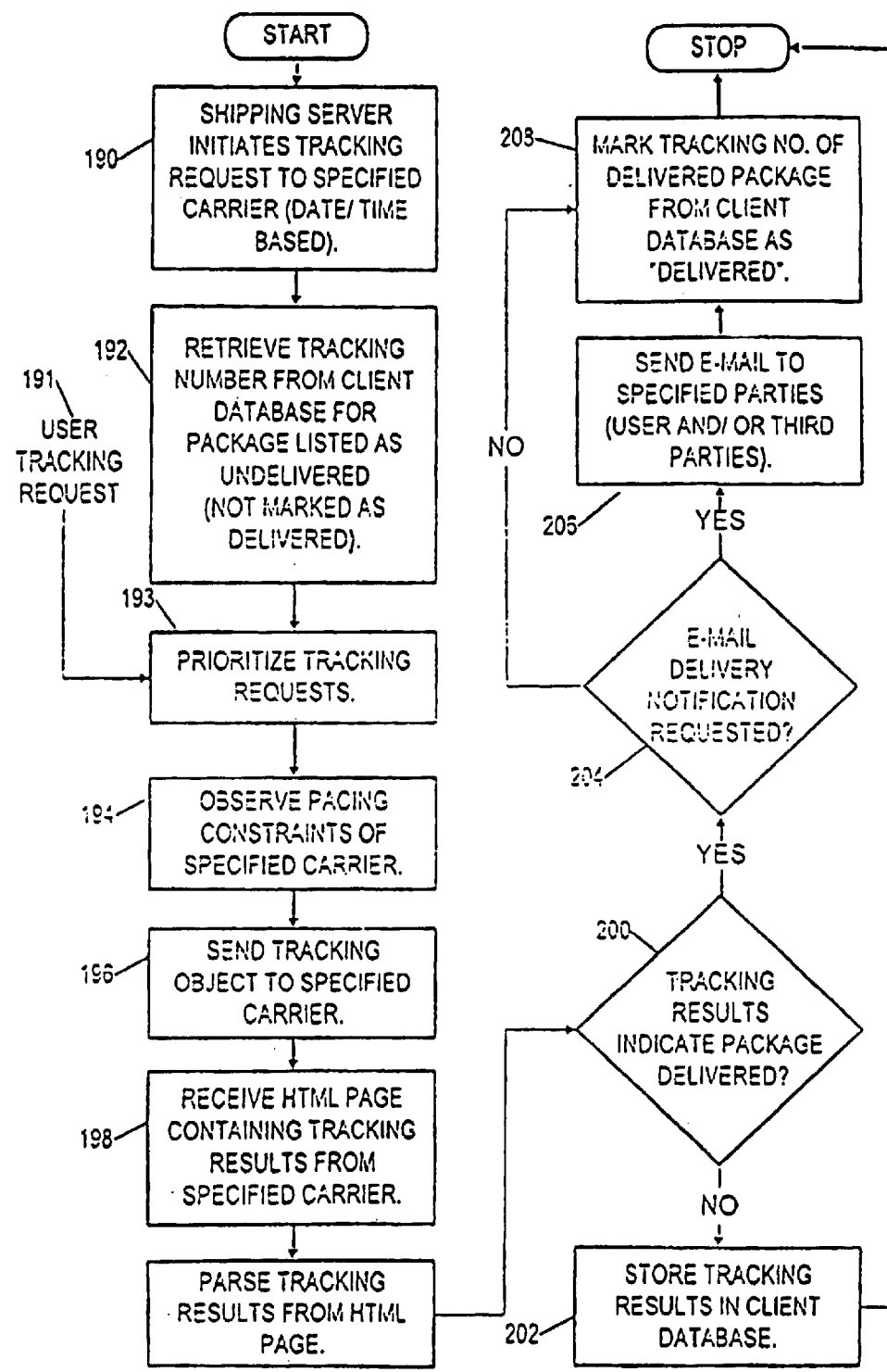
FIG. 7 is a flow chart of the tracking system and method shown in FIG. 5.

FIG. 7 represents a flow chart of the steps taken by the shipping server to determine whether a package has been delivered by a carrier to the intended recipient. Step 190 shows that the shipping server initiates a tracking request to a specified carrier, depending upon date and time constraints. Thus a specified carrier such as United Parcel Service may only have guaranteed delivery at a specified time in the morning and a specified time in the afternoon. In order to make the request for tracking information efficient, it is therefore contemplated that tracking requests be made after these guaranteed times are exceeded. Thus for instance, if morning delivery has a guaranteed time of ten thirty A.M., a tracking request (via a tracking object) to UPS may be made at eleven A.M. to determine which packages have in fact been delivered within the ten thirty time constraint. Similarly, another request could be made after four thirty P.M. if afternoon guaranteed delivery is to be made by that time. Of course, different carriers can have different constraints, both with regard to guaranteed time of delivery as well as whether deliveries are guaranteed on non-business days such as Saturdays and Sundays.

Figure 6:
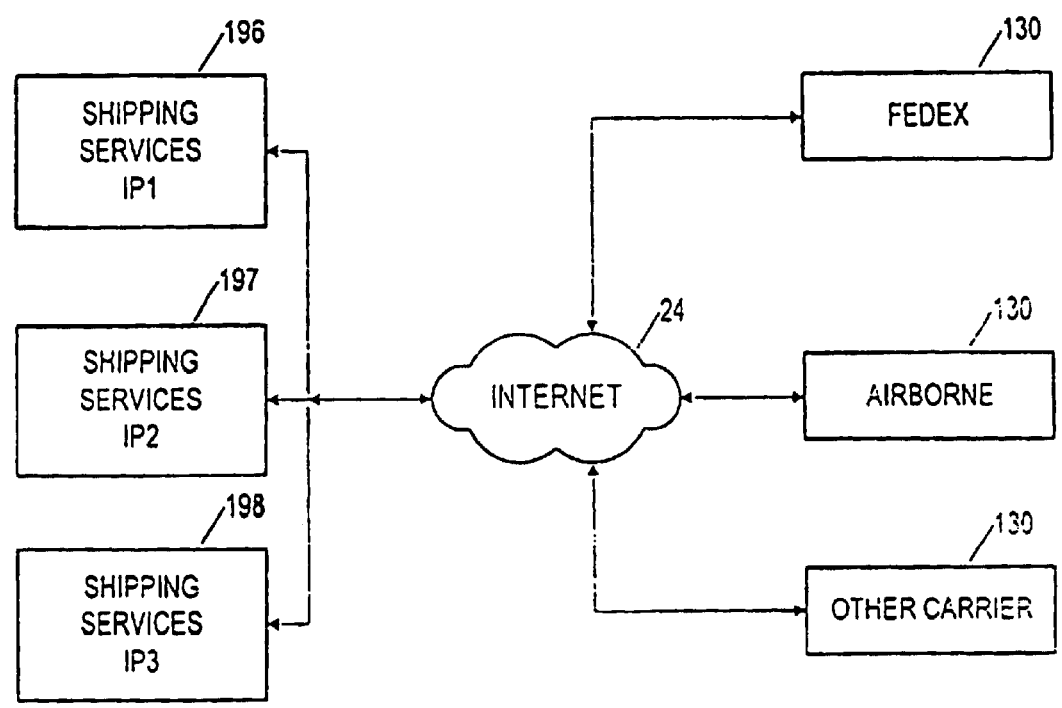
FIG. 6 is a block diagram illustrating the use of multiple Internet Protocol (IP) addresses to increase the number of tracking objects while observing tracking object constraints set by a carrier.

Step 192 shows that the next step performed is retrieving tracking numbers from the client database 76 (see FIG. 4) for packages that are being shipped by the specified carrier and which are not marked as delivered. Step 194 shows that the tracking coordinator 121 observes pacing constraints set by the specified carrier. Thus, for instance, a specified carrier may demand that no more than a given number of tracking objects be made from a particular Internet protocol (IP address), such as the IP address of the shipping server within a given period of time. This might be limited to ten tracking objects per minute or no more than a hundred tracking objects in a thirty minute period, regardless of how many are presented in any time interval within that thirty minute period. In order to partially overcome the constraints of the specified carrier, the tracking coordinator can initiate tracking objects from a plurality of server sites such as shown in FIG. 6, wherein each server site 196, 197, 198 has an associated unique IP address. In so doing, the carrier tracking website 130 will not interpret these additional tracking objects as an attack on the website since the tracking objects are emanating from unique IP addresses. FIG. 6 therefore shows multiple server sites 196, 197 and 198 so as to generate tracking objects from three unique IP addresses.

Referring again to FIG. 7, the tracking objects are then sent by the shipping server from one or more IP addresses to the specified carrier tracking website. At Step 198, the carrier tracking website has processed the tracking object and has created an HTML page that contains the tracking results for the package. These tracking results typically indicate if the package has been delivered to the recipient, and if so, the date and time of delivery. These results also typically show the dates, times and places the package has traversed in its path toward the recipient.

At step 199, the carrier's tracking results HTML page is parsed by the tracking component. This is typically performed by "scraping" the HTML page, thereby extracting the relevant tracking information.

Decisional step 200 then determines whether the tracking results indicate that the package has been delivered to the recipient. If the package is still enroute, the tracking results are stored in database 76, but the tracking number is not marked as "DELIVERED" (Step 202). This tracking number therefore is available for subsequent rescheduling to the appropriate input tracking request queue 119.

If the tracking results indicate that the package has been delivered, then that information is used to show that the package has in fact been delivered with that response then being used to invoke decisional step 204 which determines if E-mail delivery notification has been requested by the user. If an E-mail request has been made by the user, then the shipping server initiates the E-mail services 100 (see FIG. 4) and sends an E-mail notification to the parties specified by the user. One such party may of course be the user. This operation is shown by Step 206. The tracking results are also stored in the database 76 by marking the package record as "DELIVERED". This information can then be used for report purposes. This is shown by Step 208.

It is therefore seen that the automatic generation of tracking requests for undelivered packages allows the shipping server to maintain information in its database concerning the whereabouts of undelivered packages, as well as being the triggering mechanism when delivery of a package is determined, for sending E-mail notification to the sender or other designated parties. This greatly facilities the usefulness of the shipping server methodology since it augments the usefulness of the information which otherwise would have to be manually requested by the user concerning the status of a undelivered package.

In this regard, reference should again be made to FIG. 7, wherein it shows that if a user tracking request (event 191) has been made by the user (InstaTrac component 89), then that information is presented to step 193 for prioritizing the tracking requests prior to submission of those requests to the pacing step for the tracking request at step 194. This prioritization is actually performed by putting the user generated tracking request at the head of the input tracking queue of the designated carrier. In this way, the tracking request which otherwise would have been sent to the specified carrier, can allow for a prioritized request to be made by the user which otherwise might have to wait for a substantial period of time before presentation to the carrier. These functions are performed by the tracking coordinator 121.

What is claimed is:

1. A tracking system in which a package is to be sent from a user to a recipient by requesting shipping through Internet resources associated with carriers capable of delivering the package to the recipient, in which the user determines the carrier to be used for shipping a package to a particular recipient, comprising:

means for generating a tracking number, the tracking number being associated with a package to be sent from the user to the recipient by a selected carrier;

means for generating a tracking request, the tracking request containing the tracking number associated with the package, as well as information of the selected carrier which is to deliver the package to the particular recipient;

a storage location adapted to store the tracking request;

a tracking coordinator adapted to receive said tracking request and adapted to generate tracking objects, and adapted to send said tracking objects to a tracking website of the selected carrier;

means for receiving results from the tracking website of the selected carrier;

means for updating shipping server data storage with the results from the tracking website of the selected carrier website; and wherein the tracking coordinator comprises means for limiting the generation of tracking objects for the selected carrier based on pacing constraints provided by the selected carrier so as to be generated no more frequently than a carrier designated number of tracking objects per carrier designated interval.

2. A tracking system for a shipping system as defined in claim 1, further comprising a tracking result queue for receiving the results from selected carrier websites and for outputting these results for delivery to a shipping system server data storage device.

3. A tracking system for a shipping system as defined in claim 2, wherein the shipping system server has an instant tracking component for allowing a user to generate a tracking request for a package, wherein the tracking coordinator has means for generating a tracking object for the user tracking request that is prioritized with respect to other tracking objects generated for the same carrier as that associated with the users package.

4. A tracking system for a shipping system as defined in claim 3, wherein the tracking coordinator has means for generating tracking objects to a carrier tracking website using multiple Internet Protocol addresses.

5. A tracking system for a shipping system as defined in claim 3, wherein the shipping system server includes a scheduler for automatically retrieving information required to generate a tracking request from the data storage device, wherein the scheduler times said retrieval of information to occur at a predetermined time.

6. A tracking system for a shipping system as defined in claim 1, wherein the shipping system server has an instant tracking component for allowing a user to generate a tracking request for a package, wherein the tracking coordinator has means for generating a tracking object for the user tracking request that is prioritized with respect to other tracking objects generated for the same carrier as that associated with the user's package.

7. A tracking system as defined in claim 1, further comprising an E-mail services component for generating an E-mail message to a party specified by the user when the tracking information indicates that the package has been delivered to the recipient.

8. A tracking method for a shipping system in which a package is to be sent from a user to a recipient by requesting said shipping through Internet resources associated with carriers capable of delivering the package to the recipient, in which the user of the shipping system determines the carrier to be used for shipping a package to a recipient, and in which the shipping system has a shipping system server with a data storage device for storing package tracking data, comprising the steps of:

(a) generating a tracking number associated with the package to be sent from the user to the recipient by a selected carrier;

(b) generating a tracking request containing the tracking number associated with the package, as well as information of the selected carrier which is to deliver the package to the particular recipient;

(c) storing the tracking request;

(d) generating tracking objects, and sending said tracking objects to a tracking website of the selected carrier;

(e) receiving results from the tracking website of the selected carrier;

(f) updating shipping server data storage with the results from the tracking website of the selected carrier website; and (g) limiting the generation of tracking objects for the selected carrier based on pacing constraints provided by the selected carrier so as to be generated no more frequently than a carrier designated number of tracking objects per carrier designated interval.

9. A tracking method as defined in claim 8, further comprising the step of receiving the results from all of the carrier websites and for outputting these results for delivery to the shipping system server data storage device.

10. A tracking method as defined in claim 9, further comprising the steps of allowing a user to generate an instant tracking request for a package, and for generating a tracking object for the user tracking request that is prioritized with respect to other tracking objects generated for the same carrier as that associated with the user's package.

11. A tracking method as defined in claim 10, further comprising the step of generating tracking objects to a carrier tracking website using multiple Internet Protocol addresses.

12. A tracking method as defined in claim 10, further comprising the step of automatically scheduling retrieving information required to generate a tracking request from the data storage device at a predetermined time.

13. A tracking method as defined in claim 8, wherein the shipping system server has an instant tracking component for allowing a user to generate a tracking request for a package, wherein the tracking coordinator has means for generating a tracking object for the user tracking request that is prioritized with respect to other tracking objects generated for the same carrier as that associated with the user's package.

14. A tracking method as defined in claim 13, further comprising the step of generating tracking objects to a carrier tracking website using multiple Internet Protocol addresses.

15. A tracking method as defined in claim 8, further comprising the step of automatically scheduling retrieving information required to generate a tracking request from the data storage device at a predetermined time.

* * * * *